July 12, 1927.
C. G. SIGURD
1,635,442
BREAK PIN DEVICE FOR CULTIVATORS
Filed July 6, 1926
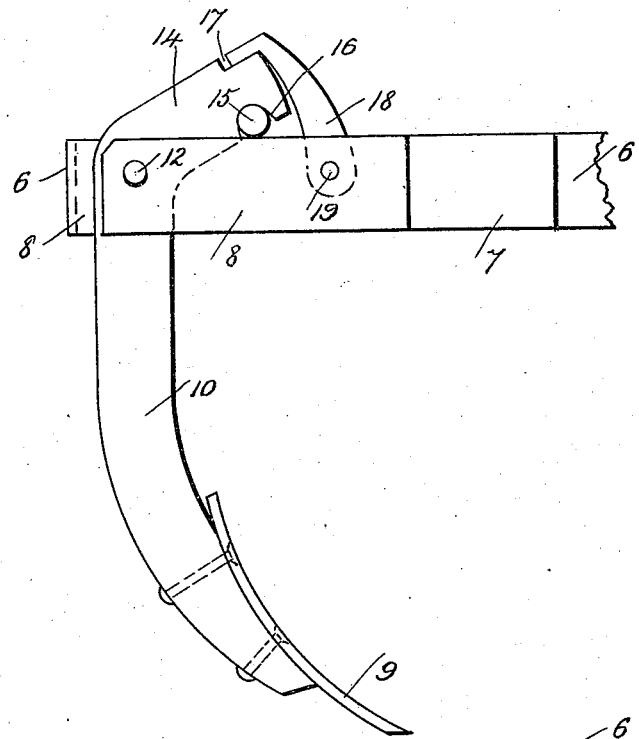
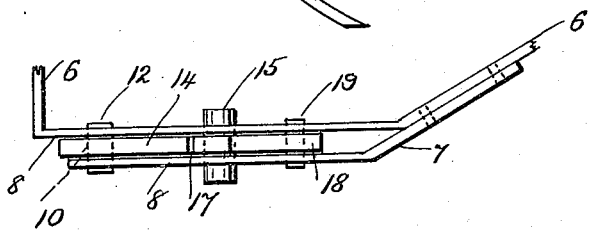
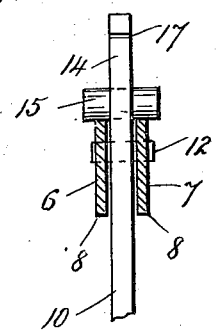
Inventor
Carl G. Sigurd
by Herbert W. Jenner,
Attorney.

Patented July 12, 1927.

1,635,442

UNITED STATES PATENT OFFICE.

CARL G. SIGURD, OF SAN JOSE, CALIFORNIA.

BREAK-PIN DEVICE FOR CULTIVATORS.

Application filed July 6, 1926. Serial No. 120,636.

This invention relates to break pin devices used on cultivators and other similar agricultural implements to permit the cultivator blade to move backward when it strikes an obstacle, such as a stone, with force sufficient to break the pin thus provided to be broken. This invention consists in the novel construction and combination of the parts hereinafter fully described and claimed, whereby the standard which carries the cultivating blade is connected with the frame of the machine.

In the drawings, Figure 1 is a side view of portions of a cultivator provided with a break pin device according to this invention. Fig. 2 is a plan view of the same. Fig. 3 is a rear end view of the upper part of the standard showing the frame bars in section.

The frame 6 of the machine is of any approved form and construction, and is mounted on ground wheels in the usual way. Brackets 7 are secured to the frame at suitable points so as to form with it a pair of longitudinal and parallel bars 8. The frame has as many of these pairs of bars as there are cultivator blades, but only one pair is shown as they are all substantially alike.

Each cultivator blade 9 is secured to a standard or shank 10, and the upper end portion of this standard is pivoted on a pin 12 between the two bars 8 of the frame. An upwardly and forwardly projecting arm 14 is provided at the top of the standard, and projects above the level of the tops of the bars 8. This arm has a wooden pin 15 arranged in a notch or hole 16 in its lower part, and this pin extends crosswise over the two bars 8, and normally prevents the blade 9 from being turned backwardly on the pivot 12.

A notch 17 is also provided in the upper part of the arm 14. A hook-shaped pawl 18 is pivoted by a pin 19 to the bars 8, in front of the standard, and the hooked end portion of this pawl normally engages with the notch 17, and prevents the blade from being moved forwardly, so that the machine works with the cultivator blades held in their preferred positions.

When the cultivator blade strikes a stone or other obstacle with sufficient force to break the pin 15, the standard turns backwardly on its pivot and no injury is done to the machine. The frame is not weakened by making holes in it for the break pins, and when a pin breaks its end portions are not jammed in holes in the frame, and it is much easier to replace the broken pin with a new pin when the new pin has merely to be slipped into the notch 16 and does not have to be fitted into any pin holes. Any cultivator blade can also be placed out of action by merely disengaging the pawl pertaining to it, as the break pin does not have to be broken or extracted from any holes in the frame.

What I claim is:

1. The combination, with a frame, of a standard pivoted to the frame and provided at its upper end with an arm which projects forwardly and above the top of the frame, a break pin arranged crosswise of and supporting the said arm and resting on the top of the frame, and a hook-shaped pawl pivoted to the frame and normally engaging with the said arm and preventing it from rising.

2. The combination, with a frame having two parallel longitudinal bars, of a standard pivoted between the bars and provided at its upper end with an arm which projects forwardly and above the bars, said arm having a notch in its lower side and another notch in its upper side, a break pin inserted in the lower notch and resting on the said bars, and a hook-shaped retaining pawl pivoted to the bars in front of the standard and engaging with the upper notch.

In testimony whereof I have affixed my signature.

CARL G. SIGURD.